US012056787B2

(12) United States Patent
Ashkar et al.

(10) Patent No.: US 12,056,787 B2
(45) Date of Patent: Aug. 6, 2024

(54) INLINE SUSPENSION OF AN ACCELERATED PROCESSING UNIT

(71) Applicant: Advanced Micro Devices, Inc., Santa Clara, CA (US)

(72) Inventors: Alexander Fuad Ashkar, Orlando, FL (US); Mangesh P. Nijasure, Orlando, FL (US); Rakan Z. Khraisha, Orlando, FL (US); Manu Rastogi, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/564,049

(22) Filed: Dec. 28, 2021

(65) Prior Publication Data

US 2023/0206379 A1 Jun. 29, 2023

(51) Int. Cl.
*G06T 1/20* (2006.01)
*G06T 15/00* (2011.01)
*G06T 15/80* (2011.01)

(52) U.S. Cl.
CPC .............. *G06T 1/20* (2013.01); *G06T 15/005* (2013.01); *G06T 15/80* (2013.01)

(58) Field of Classification Search
CPC ........... G06T 1/20; G06T 1/60; G06T 15/005; G06T 15/80; G06F 1/329; G06F 9/38; G06F 9/3851; G06F 9/461; G06F 9/4881; G06F 9/5038

USPC ........ 345/501, 503, 522; 718/100, 102, 103, 718/108
See application file for complete search history.

(56) References Cited

U.S. PATENT DOCUMENTS

| | | | |
|---|---|---|---|
| 10,002,021 B2 * | 6/2018 | Metz | G06F 9/461 |
| 2002/0049578 A1 | 4/2002 | Ohkami | |
| 2012/0120523 A1 | 5/2012 | Ooi | |
| 2012/0139930 A1 * | 6/2012 | Rogers | G06F 9/4818 345/522 |
| 2012/0194524 A1 * | 8/2012 | Hartog | G06F 9/4812 345/501 |
| 2014/0022266 A1 * | 1/2014 | Metz | G06F 9/461 345/522 |
| 2017/0116701 A1 * | 4/2017 | Acharya | G06F 9/48 |
| 2019/0018699 A1 | 1/2019 | Asaro et al. | |
| 2020/0050478 A1 | 2/2020 | Miller | |
| 2021/0216368 A1 | 7/2021 | Gutierrez et al. | |
| 2022/0020108 A1 * | 1/2022 | Uhrenholt | G06T 1/20 |

* cited by examiner

*Primary Examiner* — Jacinta M Crawford
(74) *Attorney, Agent, or Firm* — Volpe Koenig

(57) ABSTRACT

Methods and systems are disclosed for inline suspension of an accelerated processing unit (APU). Techniques include receiving a packet, including a mode of operation and commands to be executed by the APU; suspending execution of commands received in previous packets when the mode of operation is a suspension initiation mode; and executing, by the APU, the commands in the received packet. The execution of the suspended commands is restored when the mode of operation in a subsequently received packet is a suspension conclusion mode.

22 Claims, 4 Drawing Sheets

100A

100B

200

300

INLINE SUSPENSION OF AN ACCELERATED PROCESSING UNIT

BACKGROUND

A processor that requires processing large amounts of data in a limited duration of time can utilize one or more accelerated processing units (APUs). When employing an APU, conventionally, the processor is in control of the APU's operation, including sending commands to be performed by the APU and receiving command completion acknowledgments from the APU. Typically, the computing resources of an APU are shared by multiple applications, executing on one or more processors. When an application requires the execution of an intensive workload in high priority, a feature that allows the application to secure the computing resources of the APU for its exclusive use is valuable. However, suspending and then resuming the APU's current workload in favor of another workload usually requires the processor's involvement necessitating communication between the APU and the processor. Such back and forth communication between the processor and the APU impairs predictability of workload execution time by the APU.

BRIEF DESCRIPTION OF THE DRAWINGS

A more detailed understanding may be had from the following description, given by way of example in conjunction with the accompanying drawings wherein.

DETAILED DESCRIPTION

Systems and methods are disclosed for the inline suspension of an APU. Techniques are disclosed for triggering suspension, and, then, resumption of a workload being processed by the APU by inlining respective modes of operation with commands sent in packets by a processor to the APU. The ability to suspend and to resume the APU in this manner allows high priority and intensive workloads to exclusively utilize the computing resources of the APU without the processor's involvement, which, in turn, allows for predicable workload execution time.

Aspects disclosed in the present application describe methods for inline suspension of an APU. The methods comprise receiving a packet, including a mode of operation and commands to be executed by the APU; suspending execution of commands received in previous packets in response to the mode of operation being a suspension initiation mode; and executing, by the APU, the commands in the received packet. The methods further comprise restoring the execution of the suspended commands in response to the mode of operation being a suspension conclusion mode.

Aspects disclosed in the present application also describe systems for inline suspension of APU. The systems comprise at least one processor and memory storing instructions. The instructions, when executed by the at least one processor, cause the system: to receive a packet, including a mode of operation and commands to be executed by the APU; to suspend execution of commands received in previous packets in response to the mode of operation being a suspension initiation mode; and to execute, by the APU, the commands in the received packet. The instructions further cause the system to restore the execution of the suspended commands in response to the mode of operation being a suspension conclusion mode.

Further, aspects disclosed in the present application describe a non-transitory computer-readable medium comprising hardware description language instructions describing an APU adapted to perform inline suspension of the APU capable of: receiving a packet, including a mode of operation and commands to be executed by the APU; suspending execution of commands received in previous packets in response to the mode of operation being a suspension initiation mode; and executing, by the APU, the commands in the received packet. The methods further comprise restoring the execution of the suspended commands in response to the mode of operation being a suspension conclusion mode.

Figure 1A:
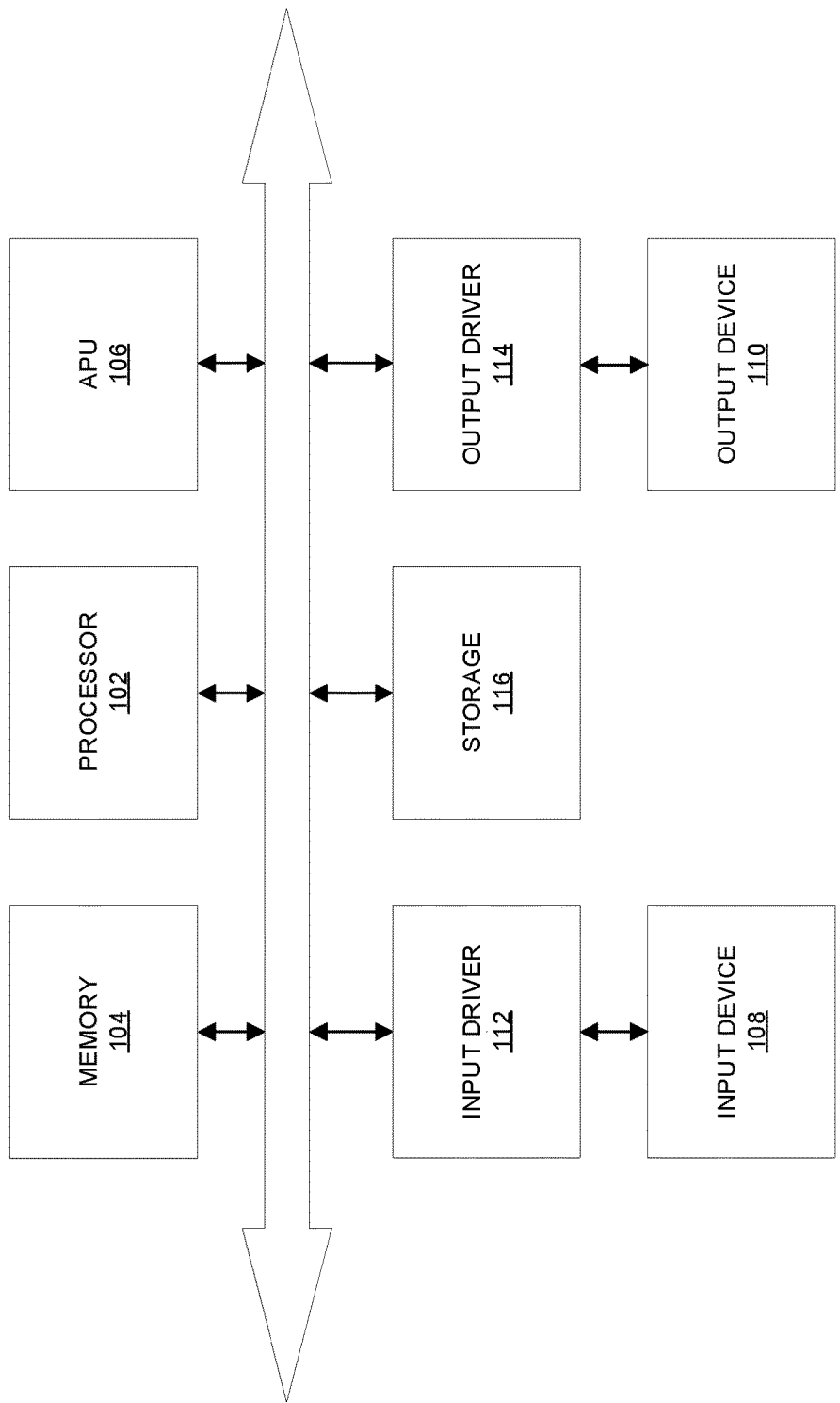
FIG. 1A is a block diagram of an example device, based on which one or more features of the disclosure can be implemented.

FIG. 1A is a block diagram of an example device 100A, based on which one or more features of the disclosure can be implemented. The device 100A can be, for example, a computer, a gaming device, a handheld device, a set-top box, a television, a mobile phone, or a tablet computer. The device 100A includes a processor 102, an APU 106, memory 104, storage 116, an input device 108, and an output device 110. The device 100A can also include an input driver 112 and an output driver 114. In an aspect, the device 100A can include additional components not shown in FIG. 1A.

The processor 102 can include a central processing unit (CPU) or one or more cores of CPUs. The APU 106 can represent a highly parallel processing unit, a graphics processing unit (GPU), or a combination thereof. The processor 102 and the APU 106 may be located on the same die or on separate dies. The memory 104 can be located on the same die as the processor 102, or can be located separately from the processor 102. The memory 104 can include volatile or non-volatile memory, for example, random access memory (RAM), dynamic RAM (DRAM), a cache, or a combination thereof.

The storage 116 can include fixed or removable storage, for example, a hard disk drive, a solid-state drive, an optical disk, or a flash drive. The input device 108 can represent one or more input devices, such as a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 110 can represent one or more output devices, such as a display, a speaker, a printer, a haptic feedback device, one or more lights, an antenna, or a network connection (e.g., a wireless local area network card for transmission of wireless IEEE 802 signals).

The input driver 112 communicates with the processor 102 and the input device 108, and facilitates the receiving of input from the input device 108 to the processor 102. The output driver 114 communicates with the processor 102 and the output device 110, and facilitates the sending of output from the processor 102 to the output device 110. In an aspect, the input driver 112 and the output driver 114 are optional components, and the device 100A can operate in the same manner when the input driver 112 and the output driver 114 are not present.

The APU 106 can be configured to accept compute commands and graphics rendering commands from processor 102, to process those compute and graphics rendering commands, and/or to provide output to a display (output device 110). As described in further detail below, the APU 106 can include one or more parallel processing units configured to perform computations, for example, in accordance with a single instruction multiple data (SIMD) paradigm. Thus, although various functionality is described herein as being performed by or in conjunction with the APU 106, in various alternatives, the functionality described as being performed by the APU 106 can be additionally or alternatively performed by other computing devices having similar capabilities that are not driven by a host processor (e.g., processor 102) and that can be configured to provide, for example, graphical output to a display. Whether or not a processing system can perform processing tasks in accordance with a SIMD paradigm, the processing system can be configured to perform the functionality described herein.

Figure 1B:
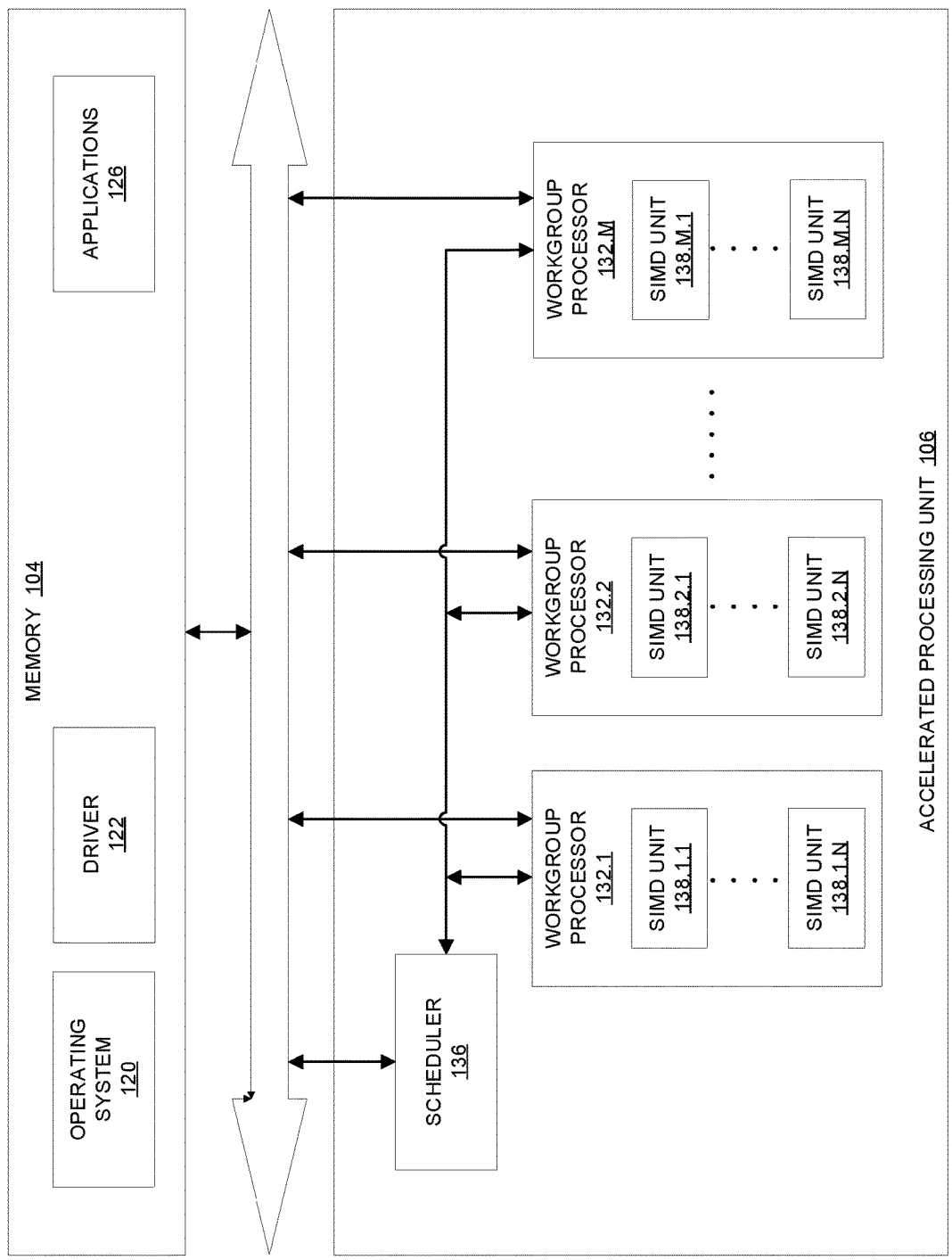
FIG. 1B is a block diagram of an example system, demonstrating an APU employable by the device of FIG. 1A, based on which one or more features of the disclosure can be implemented.

FIG. 1B is a block diagram of an example system 100B, demonstrating an accelerated system employable by the device of FIG. 1A, based on which one or more features of the disclosure can be implemented. FIG. 1B illustrates in further detail the execution of processing tasks on APU 106. The processor 102 can maintain in memory 104 one or more modules for execution by the processor 102. The modules include an operating system 120, a driver 122, and applications 126. These modules can control various features of the operation of the processor 102 and the APU 106. For example, the operating system 120 can provide system calls, that is, application programming interfaces (APIs), that can be employed by applications 126 to directly interface with the hardware. The driver 122 can control operation of the APU 106 by, for example, providing APIs to applications 126 executing on the processor 102 to access various functionality of the APU 106.

The APU 106 can execute commands related to graphics operations and non-graphics operations, including either parallel processing or sequential processing and either ordered or non-ordered processing. The APU 106 can be used for executing graphics pipeline operations—such as operations that process pixels and/or geometric computations (e.g., rendering an image to the display (output device 110))—based on commands received from the processor 102. The APU 106 can also execute processing operations that are not related to graphics operations, such as operations related to processing of multi-dimensional data, physics simulations, computational fluid dynamics, or other computational tasks, based on commands received from the processor 102. APU 106 can, in alternative embodiments, perform signal processing operations (e.g., APU 106 can be embodied in a digital signal processor or DSP), perform accelerated operations through use of a field programmable gate array (FPGA) configured by a bitstream, perform neural processing operations through use of a neural processing unit (or NPU) or other operations that may be more efficiently performed through use of an accelerated processing unit (APU) rather than by processor 102.

The APU 106 can include workgroup processors (WGPs) 132.1-M; each WGP, e.g., 132.1, can have one or more SIMD units, e.g., 138.1.1-N, that can perform operations in a parallel manner according to a SIMD paradigm. The SIMD paradigm is one in which multiple processing elements share a single program control flow unit and program counter, and, thus, can execute the same program but on different data. In one example, each SIMD unit, e.g., 138.1.1, can run 64 lanes (i.e., threads), where each lane executes the same instruction at the same time as the other lanes in the SIMD unit, but executes that instruction on different data. Lanes can be switched off with predication, such as when not all the lanes are needed to execute a given instruction. Predication can also be used to execute programs with divergent control flows. Specifically, for programs with conditional branches (or other instructions where control flow is based on calculations performed by an individual lane), predication of lanes corresponding to control flow paths not currently being executed and serial execution of different control flow paths allows for arbitrary control flow. In an aspect, each of the WGPs 132.1-M can have a local cache. In another aspect, multiple WGPs can share a cache.

The basic unit of execution in a WGP, e.g., 132.1, is a work-item. Typically, each work-item represents a single instantiation of a program that can be executed in parallel in a particular lane. Work-items can be executed simultaneously as a "wavefront" (or a "wave") on a single SIMD, e.g., 138.1.1. One or more waves can be run in a workgroup, each wave including a collection of work-items designated to execute the same program. A workgroup is executed by executing each of the waves that make up the workgroup. The waves can also be executed sequentially on a single SIMD unit or partially or fully in parallel on different SIMD units, 138.1-N. Thus, a wave can be thought of as a collection of work-items that can be executed simultaneously on a single SIMD unit e.g., 138.1.1. If commands received from the processor 102 indicate that a particular program is to be parallelized to such a degree that the program cannot be executed on a single SIMD unit simultaneously, then that program can be broken up into waves that can be parallelized on two or more SIMD units (e.g., 138.1.1-N), serialized on the same SIMD unit (e.g., 138.1.1.), or both parallelized and serialized as needed. A scheduler 136 can be configured to perform operations related to launching various waves on the different WGPs 132.1-M and their respective SIMD units.

The parallelism afforded by the WGPs 132.1-M is suitable, for example, for graphics-related operations such as operations on pixel values (e.g., filter operations), operations on geometrical data (e.g., vertex transformations), and other graphics-related operations. For example, an application 126, executing on the processor 102, can involve computations to be performed by the APU 106. The application 126 can use APIs provided by the driver 122 to issue processing commands to the APU 106. The processing commands are then provided to the scheduler 136. The scheduler 136 translates the processing commands into computation tasks that are assigned to the WGPs 132.1-M for execution in parallel. For example, the scheduler 136 may receive a processing command that includes instructions to be perform on data (e.g., 1024 pixels of an image). In response, the scheduler 136 can chunk the data into groups (e.g., each group containing data required for the processing of 64 pixels) and launch waves in one or more WGPs, each wave associated with a group of data and instructions to perform on the data. For example, the scheduler 136 may launch 16 waves (e.g., each in charge of processing 64 pixels) to be executed in SIMDs 138 of one or more WGPs 132.

Figure 2:
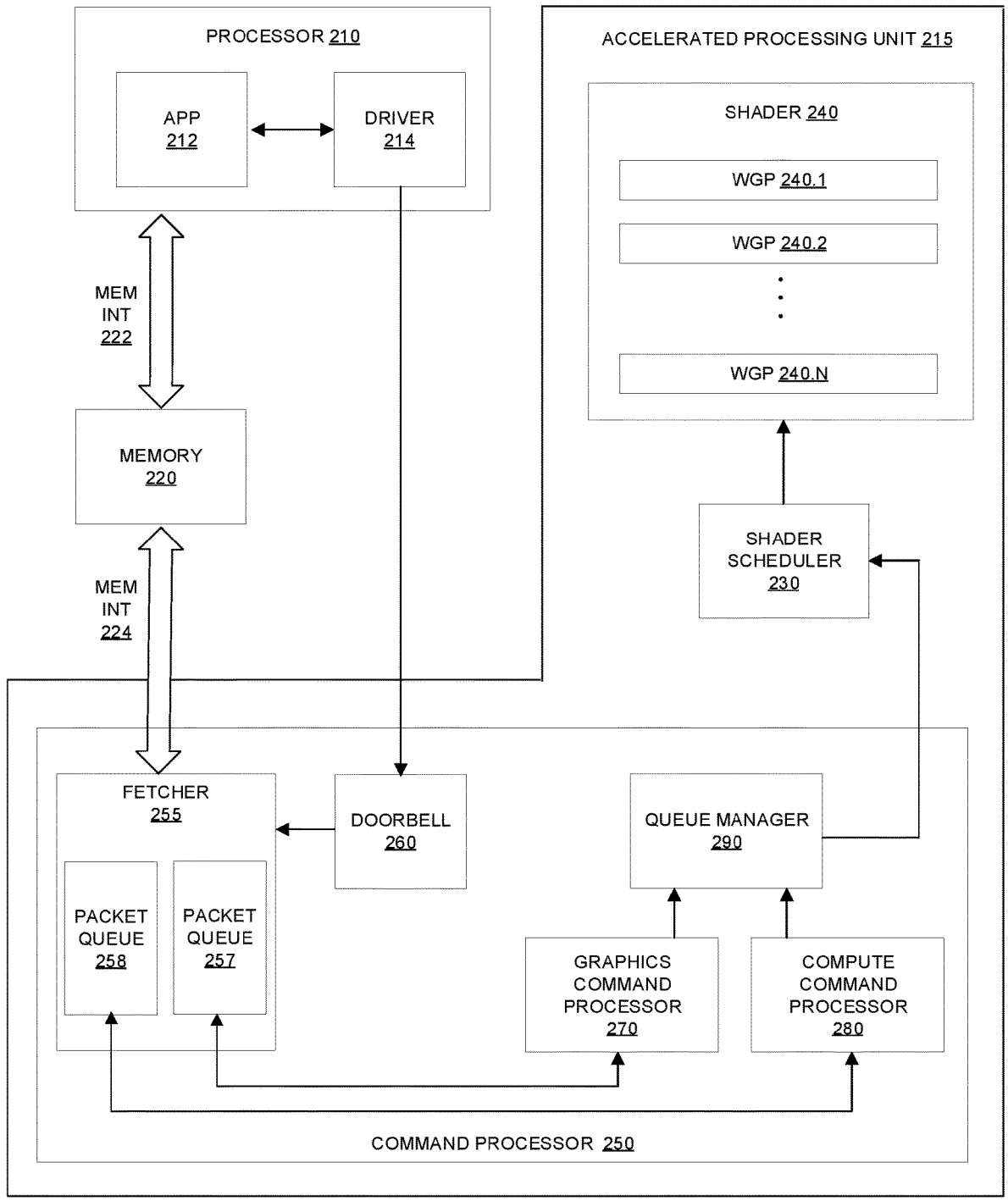
FIG. 2 is a functional block diagram of an example system, demonstrating inline suspension of an APU, based on which one or more features of the disclosure can be implemented.

FIG. 2 is a functional block diagram of an example system 200, demonstrating inline suspension of an APU, based on which one or more features of the disclosure can be implemented. The system 200 includes a processor 210 (e.g., the processor 102 of FIG. 1A), an APU 215 (e.g., the APU 106 of FIG. 1B), and memory 220 (e.g., the memory 104 of FIG. 1A). The APU 215 includes a command processor 250, a shader scheduler 230, and a shader 240, having WGPs 240.1-N (e.g., the WGPs 132 of FIG. 1B). The memory 220 is accessible by the processor 210 and the command processor 250 via memory interfaces, 222 and 224, respectively. The processor 210 is configured to execute software modules, such as a user application 212 and a driver 214, through which the application 212 can interface with the command processor 250. Thus, an application 212, such as a computer game or a simulator, may use an application programming interface (API) provided by the driver 214, to send commands to the command processor 250 that specify computational tasks to be performed by the shader 240. Such commands are delivered within packets in accordance with a packet format, as further described below.

The command processor 250 is configured to provide an interface between software modules running on the processor 210 and execution (or processing) engines of the APU 215, such as the shader 240. The command processor 250 can include functional components, such as a fetcher 255, a doorbell 260, a graphics command processor 270, a compute command processor 280, and a queue manager 290. As mentioned above, a user application 212, via the driver 214, can generate packets of commands that are to be delivered to the command processor 250. One mechanism of delivery may be by storing these packets in an application associated queue in the memory 220 (via the memory interface 222), and, then, signaling the command processor's doorbell 260 that one or more new packets are available in that queue in memory. In response to receiving such a signal, the doorbell is configured to trigger a reading of the one or more new packets by the fetcher 255. The fetcher 255, then, reads the packets from the queue in memory 220 (via the memory interface 224) and pushes the read packets into packet queues 257, 258 in a first in first out (FIFO) order. Packets that contain draw (graphics) commands are stored in queue 257 and packets that contain compute dispatch commands are stored in queue 258. The graphics command processor 270 and the compute command processor 280, in turn, are configured to pop out packets from queues 257 and 258, respectively, upon the packets' arrival. When multiple applications 212 (e.g., concurrently executing on the host 210) generate respective packets, the packets associated with each application may be stored in a respective queue in memory, and the fetcher 255 is configured to read the packets from each queue in memory 220 and to push the read packets into respective packet queues 257, 258.

In an aspect, a packet format may contain a packet header and one or more commands. As disclosed herein, the packet header encodes a mode of operation, including a passthrough mode, a suspension initiation mode, and a suspension conclusion mode. In a passthrough mode of operation the command processor 250 operates under a normal state of operation. That is, newly arrived commands are processed by the currently available computing resources. For example, if all the WGPs 240.1-N are engaged in processing waves associated with previously received commands, the newly arrived commands will have to wait until one or more of the WGPs will become available. In contrast, in a suspension initiation mode of operation, the command processor 250 is configured to suspend execution of currently processed waves and make all WGPs available for the execution of waves associated with the newly arrived commands. This mode of operation is held until a suspension conclusion mode of operation is brought into effect, at which time the execution of the suspended waves is restored and the command processor 250 returns to operate under a normal state of operation again. The manner in which these three modes of operations can be handled is further disclosed below.

When a packet that encodes a passthrough mode of operation in its header is received, the command processor 250 decodes the packet's commands. Commands within the packet may be commands that are used to set state or control registers associated with components of the APU 215. Commands within a packet may also be commands that are used for synchronization operations. A substantial number of commands within a packet may be related to computational tasks directed at the shader 240, such as draw (graphics) commands and compute dispatch commands. Thus, the command processor 250, when decoding a command may act on the command (set a state register in accordance with the command, for example) or may send the command to a destination component to act on it. Draw (graphics) commands or compute dispatch commands are processed by the graphics command processor 270 or by the compute command processor 280, respectively. These processors 270, 280 translate the respective commands into shader commands. The queue manager 290 stores these shader commands into respective queues and connects these queues to execution pipes to be fed to the shader scheduler 230. The shader scheduler 230, in turn, assigns the shader commands to available WGPs 240.1-N.

Hence, in a passthrough mode of operation, commands are processed by the command processor 250 based on the currently available computing resources, that is, computational tasks prescribed by these commands will be scheduled 230 to currently available WGPs of the shader 240. However, when a packet that encodes a suspension initiation mode of operation in its header is received, the command processor 250 initiates a suspension operation of currently processed waves on the WGPs 240.1-N of the shader 240, before the commands in the packet are processed. Likewise, when a packet that encodes a suspension conclusion mode of operation in its header is received, the commands in the packet are processed, and, then, the command processor 250 concludes the suspension by restoring the suspended waves to continue their processing. Commands that are received during a suspension phase—that is, the phase starting with a packet that encodes a suspension initiation mode and ending with a packet that encodes a suspension conclusion mode—have available to them all the computing resources of the APU, and so they can be exclusively scheduled on all the WGPs 240.1-N of the shader 240. During a suspension phase, then, the APU processes exclusively commands in packets that are fetched from a queue in memory 220 that is associated with the application that generated the packets (the application that initiated the suspension mode, according to aspects disclosed herein). The APU will not serve (e.g., will not fetch) packets that are stored in queues in memory 220 that are associated with other applications, until the suspension phase ends.

Thus, when a suspension initiation mode is decoded from a header of a packet, as discussed above, a suspension operation is triggered. That is, the command processor 250 signals the queue manager 290 to halt connection of any new queues to execution pipes that feed the shader scheduler 230. Further, the queue manager 290 is signaled to switch off, pause or halt any queues that are currently connected to execution pipes. In an aspect, based on information in the header of the packet, suspension may be carried out by suspending currently running waves, by letting such waves to drain, or by a combination thereof. Once the suspension operation has been completed, all the shader resources are made available—the shader's WGPs are not in use, and, so, are available to be scheduled with computational tasks as prescribed by commands received during the suspension phase. The suspension phase lasts until a suspension conclusion mode is decoded from the header of a subsequent packet. At that time, as discussed above, the suspended waves are restored.

Suspending currently running waves can be employed by a procedure called compute wave save restore (CWSR) procedure, through which waves can be suspended and restored. In a CWSR procedure the command processor 250 commands the shaders 240.1-N currently executing the waves, to save their state to memory and remove themselves from execution. The command processor 250 then triggers a hardware machine to save a wave replay list to a stack in memory. To restore back the waves, the command processor 250 pushes back the stack onto the hardware execution units and then the replayed waves will restore their state and resume operation where they previously left off.

Figure 3:
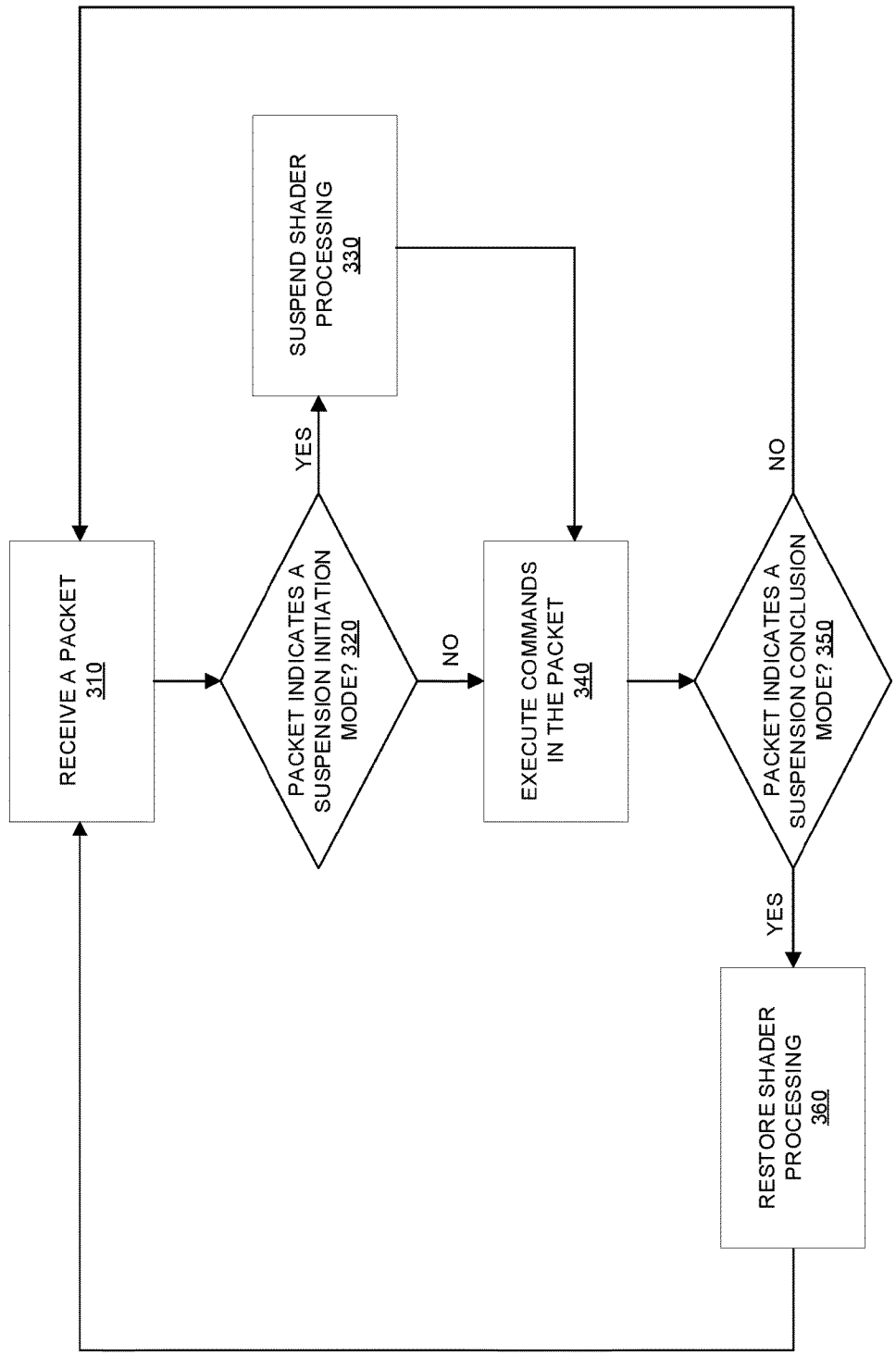
FIG. 3 is a flowchart of an example method for inline suspension of an APU, based on which one or more features of the disclosure can be implemented.

FIG. 3 is a flowchart of an example method 300 for inline suspension of an APU 215, based on which one or more features of the disclosure can be implemented. During a regular course of operation, the processor 210 sends commands associated with computational tasks to the APU 215 via one or more packets. The method 300, thus, begins with receiving a packet, in step 310. In step 320, the header of the received packet is decoded to determine the mode of operation. If the determined mode of operation is not a suspension initiation mode, in step 340, the commands in the received packet are executed based on the currently available computing resources of the APU 215. Accordingly, waves associated with commands in the received packet may have to share the WGP 240.1-N with other (currently executing) waves associated with commands that were received from previously received packets. However, if the mode of operation is determined to be a suspension initiation mode, in step 330, the shader processing is suspended. That is, currently executing waves in the WGPs 240.1-N are suspended to make all the computing resources of the shader 240 available. Once suspension is completed, the commands in the received packet are exclusively executed by the shader 240, in step 340. In step 350, if the mode of operation is determined to be a suspension conclusion mode, then the suspended waves are restored in step 360. Once the suspended waves are restored 360, the suspension phase (lasting between step 330 and step 360) is ended. That is, commands in subsequent packets will be executed while sharing computing resources with the restored waves, until a packet is received that encodes a suspension initiation mode of operation that will trigger again another suspension phase.

In an aspect, the mode of operation may be altered by the APU 215, for example, based on events associated with the processing of commands received in one or more packets. The mode may be altered from a passthrough mode of operation (during a normal state of operation) to a suspension initiation mode of operation, to bring into effect operation in a suspension phase. Alternatively, the mode may be altered from a passthrough mode of operation (during operation in a suspension phase) to a suspension conclusion mode of operation, to halt operation in a suspension phase. For example, during the processing of commands by the graphics command processor 270 or by the compute command processor 280 (or during the processing of waves that execute shader commands associated with these processed commands), an event may occur that calls for taking over all the computing resources for the execution of all or a subset of these commands. In such circumstances, the command processor 250 can decide to change the mode of operation from a passthrough mode to a suspension initiation mode in order to dedicate all the computing resources of the APU for the performance of this command subset. At the end of execution of this command subset, the command processor 250 can change the mode of operation to a suspension conclusion mode, returning to a normal state of operation. Alternatively, during the processing of commands under a suspension phase, an event may occur that calls for exiting the suspension phase, in which case the command processor 250 can change the mode of operation to a suspension conclusion mode.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for inline suspension of an accelerated processing unit (APU), comprising:

receiving a packet that includes an indication of a mode of operation from among a plurality of operating modes and commands to be executed by the APU, wherein the indication of the mode of operation is included in a header of the packet and the plurality of the operating modes includes a passthrough mode, a suspension initiation mode, and a suspension conclusion mode;

in response to the indication of the mode of operation received in the packet indicating the suspension initiation mode, suspending execution of commands in previous packets by processors of the APU and executing the commands in the packet by the processors of the APU;

in response to the indication of the mode of operation received in the packet indicating the passthrough mode, queuing the commands in the packet until one or more of the processors of the APU become available; and restoring the execution of the commands in the previous packets in response to the indication of the mode of operation received in the packet indicating the suspension conclusion mode.

2. The method of claim 1, wherein the suspending execution of the commands in the previous packets comprises:
disconnecting queues from respective execution pipes, the queues containing shader commands associated with commands in the previous packets.

3. The method of claim 1, wherein the suspending execution of the commands in the previous packets comprises:
based on information further included in the packet, suspending waves that are currently run by the APU, the waves executing shader commands associated with commands in the previous packets.

4. The method of claim 1, wherein the suspending execution of the commands in the previous packets comprises:
employing a compute wave save restore (CWSR) procedure to suspend waves associated with the commands in the previous packets.

5. The method of claim 1, wherein the suspending execution of the commands in the previous packets comprises:
based on information further included in the packet, draining waves that are currently run by the APU, the waves executing shader commands associated with commands received in the previous packets.

6. The method of claim 1, wherein the mode of operation is altered by the APU based on events associated with processing of commands in the packet or the previous packets.

7. The method of claim 1, wherein the APU is one of: a graphics processing unit, a digital signal processor, a field programmable gate array processor, or a neural processing unit.

8. The method of claim 1, wherein the executing is by an execution engine of the APU.

9. The method of claim 8, wherein the execution engine is a shader.

10. The method of claim 1, wherein the packet is fetched by the APU from a queue in memory, the queue is associated with an application that generated the packet.

11. A system for inline suspension of an accelerated processing unit (APU), comprising:
at least one processor; and
memory storing instructions that, when executed by the at least one processor, cause the system to:
receive a packet that includes an indication of a mode of operation from among a plurality of operating modes and commands to be executed by the APU, wherein the indication of the mode of operation is included in a header of the packet and the plurality of the operating modes includes a passthrough mode, a suspension initiation mode and a suspension conclusion mode,
in response the indication of the mode of operation received in the packet indicating the suspension initiation mode, suspend execution of commands in previous packets by processors of the APU and execute the commands in the packet by the processors of the APU,
in response to the indication of the mode of operation received in the packet indicating the passthrough mode, queuing the commands in the packet until one or more of the processors of the APU become available, and
restore the execution of the commands in the previous packets in response to the indication of the mode of operation received in the packet indicating the suspension conclusion mode.

12. The system of claim 11, wherein the suspending execution of the commands in the previous packets comprises:
disconnecting queues from respective execution pipes, the queues containing shader commands associated with commands in the previous packets.

13. The system of claim 11, wherein the suspending execution of the commands in the previous packets comprises:
based on information further included in the packet, suspending waves that are currently run by the APU, the waves executing shader commands associated with commands in the previous packets.

14. The system of claim 11, wherein the suspending execution of the commands in the previous packets comprises:
employing a compute wave save restore (CWSR) procedure to suspend waves associated with the commands in the previous packets.

15. The system of claim 11, wherein the suspending execution of the commands in the previous packets comprises:
based on information further included in the packet, draining waves that are currently run by the APU, the waves executing shader commands associated with commands in the packets.

16. The system of claim 11, wherein the mode of operation is altered by the APU based on events associated with processing of commands in the packet or the previous packets.

17. A non-transitory computer-readable medium comprising hardware description language instructions describing an accelerated processing unit (APU) adapted to perform inline suspension of the APU capable by executing a method comprising:
receiving a packet that includes an indication of a mode of operation from among a plurality of operating modes and commands to be executed by the APU, wherein the indication of the mode of operation is included in a header of the packet and the plurality of the operating modes includes a passthrough mode, a suspension initiation mode and a suspension conclusion mode;
in response to the indication of the mode of operation received in the packet indicating the suspension initiation mode suspending execution of commands in previous packets by processors of the APU and executing the commands received in the packet;
in response to the indication of the mode of operation received in the packet indicating the passthrough mode, queuing the commands in the packet until one or more of the processors of the APU become available; and
restoring the execution of the commands in the previous packets in response to the indication of the mode of operation received in the packet indicating the suspension conclusion mode.

18. The non-transitory computer-readable medium of claim 17, wherein the suspending execution of the commands in the previous packets comprises:
disconnecting queues from respective execution pipes, the queues containing shader commands associated with commands received in the previous packets.

19. The non-transitory computer-readable medium of claim 17, wherein the suspending execution of the commands in the previous packets comprises:
 based on information further included in the packet, suspending waves that are currently run by the APU, the waves executing shader commands associated with commands in the previous packets.

20. The non-transitory computer-readable medium of claim 17, wherein the suspending execution of the commands in the previous packets comprises:
 employing a compute wave save restore (CWSR) procedure to suspend waves associated with the commands in the previous packets.

21. The non-transitory computer-readable medium of claim 19, wherein the suspending execution of the commands in the previous packets comprises:
 based on information further included in the packet, draining waves that are currently run by the APU, the waves executing shader commands associated with commands in the packets.

22. The non-transitory computer-readable medium of claim 19, wherein the mode of operation is altered by the APU based on events associated with processing of commands in the packet or the previous packets.

* * * * *